(12) United States Patent
Kim et al.

(10) Patent No.: US 10,377,283 B2
(45) Date of Patent: Aug. 13, 2019

(54) METHOD OF MANUFACTURING SLIM FOAM PAD FOR VEHICLE SEATS AND SLIM FOAM PAD FOR VEHICLE SEATS MANUFACTURED USING THE SAME

(71) Applicants: Hyundai Motor Company, Seoul (KR); Kia Motors Corporation, Seoul (KR)

(72) Inventors: Eun Sue Kim, Ansan-si (KR); Nam Kue Park, Busan (KR); Gi Cheol Woo, Ulsan (KR); Hyun Jong Lee, Ulsan (KR); Dae Ig Jung, Suwon-si (KR); Il Hong Park, Yongin-si (KR); Sang Heon Lee, Ulsan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/810,703

(22) Filed: Nov. 13, 2017

(65) Prior Publication Data

US 2018/0370402 A1 Dec. 27, 2018

(30) Foreign Application Priority Data

Jun. 27, 2017 (KR) .......................... 10-2017-0081040

(51) Int. Cl.
*B60N 2/70* (2006.01)
*B29C 44/12* (2006.01)
(Continued)

(52) U.S. Cl.
CPC ............ *B60N 2/7017* (2013.01); *B29C 44/08* (2013.01); *B29C 44/1285* (2013.01); *B29C 45/14065* (2013.01); *B29C 45/14795* (2013.01); *B29C 45/1676* (2013.01); *B60N 2/646* (2013.01); *B29C 44/04* (2013.01); (Continued)

(58) Field of Classification Search
CPC ............................ B60N 2/7017; B60N 2/646; B29C 45/14065; B29C 45/14795; B29C 45/1676; B29C 2045/1678; B29C 2045/14155; B29L 2031/771; B29K 2105/04; B29K 2995/007
USPC .............. 297/452.1, 452.26, 452.27, 452.37, 297/DIG. 1
See application file for complete search history.

(56) References Cited

U.S. PATENT DOCUMENTS 6,652,034 B1 * 11/2003 Schramm ............... A47C 7/185
297/452.29

FOREIGN PATENT DOCUMENTS

JP 2575766 B2 1/1997
JP 2003-094452 A 4/2003
(Continued)

*Primary Examiner* — Justin V Lewis
(74) *Attorney, Agent, or Firm* — Morgan, Lewis & Bockius LLP

(57) ABSTRACT

A method of manufacturing a slim foam pad for vehicle seats, may include injecting a first foam solution into a first mold to manufacture an upper pad; inserting the manufactured upper pad into a second mold; and injecting a second foam solution to a first surface of the upper pad inserted into the second mold to manufacture a lower pad integrally coupled to the upper pad, wherein the second foam solution is foamed in a state of being in direct contact with the first surface of the upper pad, wherein no additional border separation member is provided at a border between the upper pad and the lower pad.

8 Claims, 4 Drawing Sheets

(51) Int. Cl.

| | |
|---|---|
| *B29C 44/08* | (2006.01) |
| *B29C 45/14* | (2006.01) |
| *B29C 45/16* | (2006.01) |
| *B60N 2/64* | (2006.01) |
| B29K 105/04 | (2006.01) |
| B29L 31/00 | (2006.01) |
| B29L 31/58 | (2006.01) |
| B29C 44/04 | (2006.01) |

(52) U.S. Cl.
CPC .............................. *B29C 44/1271* (2013.01); *B29C 2045/14155* (2013.01); *B29C 2045/1678* (2013.01); *B29K 2105/04* (2013.01); *B29K 2995/007* (2013.01); *B29L 2031/58* (2013.01); *B29L 2031/771* (2013.01)

(56) References Cited

FOREIGN PATENT DOCUMENTS

| JP | 2011-177227 A | 9/2011 |
|---|---|---|
| KR | 10-2013-0027799 A | 3/2013 |
| KR | 10-2015-0080685 A | 7/2015 |
| KR | 10-2015-0117377 A | 10/2015 |
| KR | 10-1579425 B1 | 12/2015 |

\* cited by examiner

METHOD OF MANUFACTURING SLIM FOAM PAD FOR VEHICLE SEATS AND SLIM FOAM PAD FOR VEHICLE SEATS MANUFACTURED USING THE SAME

CROSS-REFERENCE(S) TO RELATED APPLICATIONS

The present application claims priority to Korean Patent Application No. 10-2017-0081040, filed on Jun. 27, 2017, the entire contents of which is incorporated herein for all purposes by the present reference.

BACKGROUND OF THE INVENTION

Field of the Invention

The present invention relates to a method of manufacturing a slim foam pad for vehicle seats having a small thickness, and a slim foam pad for vehicle seats manufactured using the same.

Description of Related Art

A vehicle seat includes a cushioned foam pad and a pad cover configured for covering the foam pad. The foam pad includes an upper pad, on which the load of an occupant is concentrated, a lower pad for supporting the upper pad from under the upper pad, and a bolster located at a side of the lower pad.

The upper pad may be a foam pad which is soft to improve riding comfort, the lower pad may be a foam pad which is hard to securely support the upper pad, and the bolster may be a foam pad which is hard to maintain the posture of the occupant.

Autonomous vehicles have been developed wherein the internal of the vehicles can be more efficiently utilized while becoming more spacious. To the present end, a slim seat having a small thickness has been actively developed.

To develop such a slim seat, it is, first of all, necessary to develop a slim foam pad. In a conventional foam pad generally manufactured by foaming, a border separation member (e.g., a hardness separation member or a portion of non-woven fabric) is disposed between a soft upper pad and a hard lower pad. However, it is difficult to manufacture a slim foam pad due to such a border separation member. Furthermore, manufacturing costs are increased and productivity is lowered due to the use of such a border separation member.

The information disclosed in the present Background of the Invention section is only for enhancement of understanding of the general background of the invention and should not be taken as an acknowledgment or any form of suggestion that the present information forms the related art already known to a person skilled in the art.

BRIEF SUMMARY

Various aspects of the present invention are directed to providing a method of manufacturing a slim foam pad for vehicle seats which is configured for manufacturing a slim foam pad having a small thickness, wherein an additional border separation member is not provided between a soft upper pad and a hard lower pad, by foaming, and a slim foam pad for vehicle seats manufactured using the same.

Various aspects of the present invention are directed to providing a method of manufacturing a slim foam pad for vehicle seats which is configured for foaming a bolster simultaneously when foaming the lower pad and, in addition, manufacturing the lower pad and the bolster wherein the lower pad and the bolster have different magnitudes of hardness and a slim foam pad for vehicle seats manufactured using the same.

In accordance with an aspect of the present invention, the above and other objects can be accomplished by the provision of a method of manufacturing a slim foam pad for vehicle seats, the method including injecting a first foam solution into a first mold to manufacture an upper pad, inserting the manufactured upper pad into a second mold, and injecting a second foam solution to one surface of the upper pad inserted into the second mold to manufacture a lower pad integrally coupled to the upper pad, wherein the second foam solution is foamed in the state of being in direct contact with the one surface of the upper pad, whereby no additional border separation member is provided at the border between the upper pad and the lower pad.

When the second foam solution is injected into the second mold, a third foam solution may also be injected into a bolster cavity defined in the second mold to simultaneously manufacture the lower pad integrally coupled to the upper pad and a bolster integrally coupled to the lower pad by foaming.

The first foam solution may be softer than the second foam solution and the third foam solution, the second foam solution may be harder than the first foam solution, and the third foam solution may be harder than the second foam solution, wherein the upper pad, the lower pad, and the bolster may have different magnitudes of hardness.

The first foam solution may be softer than the second foam solution, the second foam solution may be harder than the first foam solution, and the second foam solution and the third foam solution may be solutions having the same ingredients, wherein the upper pad may have a magnitude of hardness different from the magnitude of hardness of the lower pad or the bolster while the lower pad has the same magnitude of hardness as the bolster.

The upper pad inserted into the second mold may be fixed by vacuum suction to prevent movement, and the second foam solution and the third foam solution may be injected into the second mold after the upper pad is fixed by vacuum suction.

A partition may be disposed in the bolster cavity, and the second foam solution and the third foam solution injected into the second mold may be prevented from being mixed with each other by the partition.

A flange which defines an external edge portion of the upper pad may cover a protrusion formed in the second mold in a surrounding fashion when the upper pad is inserted into the second mold, and the second foam solution may be prevented from being introduced into a gap between the upper pad and the second mold by the flange, which covers the protrusion.

Various aspects of the present invention are directed to providing a slim foam pad for vehicle seats manufactured using a manufacturing method according to an exemplary embodiment of the present invention, the slim foam pad including a soft upper pad, on which an occupant is accommodated, a lower pad integrally coupled to the upper pad to cover a bottom surface and a side surface of the upper pad, the lower pad being harder than the upper pad, and a bolster integrally coupled to a side of the lower pad, the bolster being harder than the upper pad, wherein no additional border separation members are provided at the border between the upper pad and the lower pad or at the border between the lower pad and the bolster.

The bolster may be harder than the lower pad, wherein the lower pad and the bolster may have different magnitudes of hardness, or the lower pad and the bolster may have the same magnitude of hardness.

The methods and apparatuses of the present invention have other features and advantage which will be apparent from or are set forth in more detail in the accompanying drawings, which are incorporated herein, and the following Detailed Description, which together serve to explain certain principles of the present invention.

Figure 1:
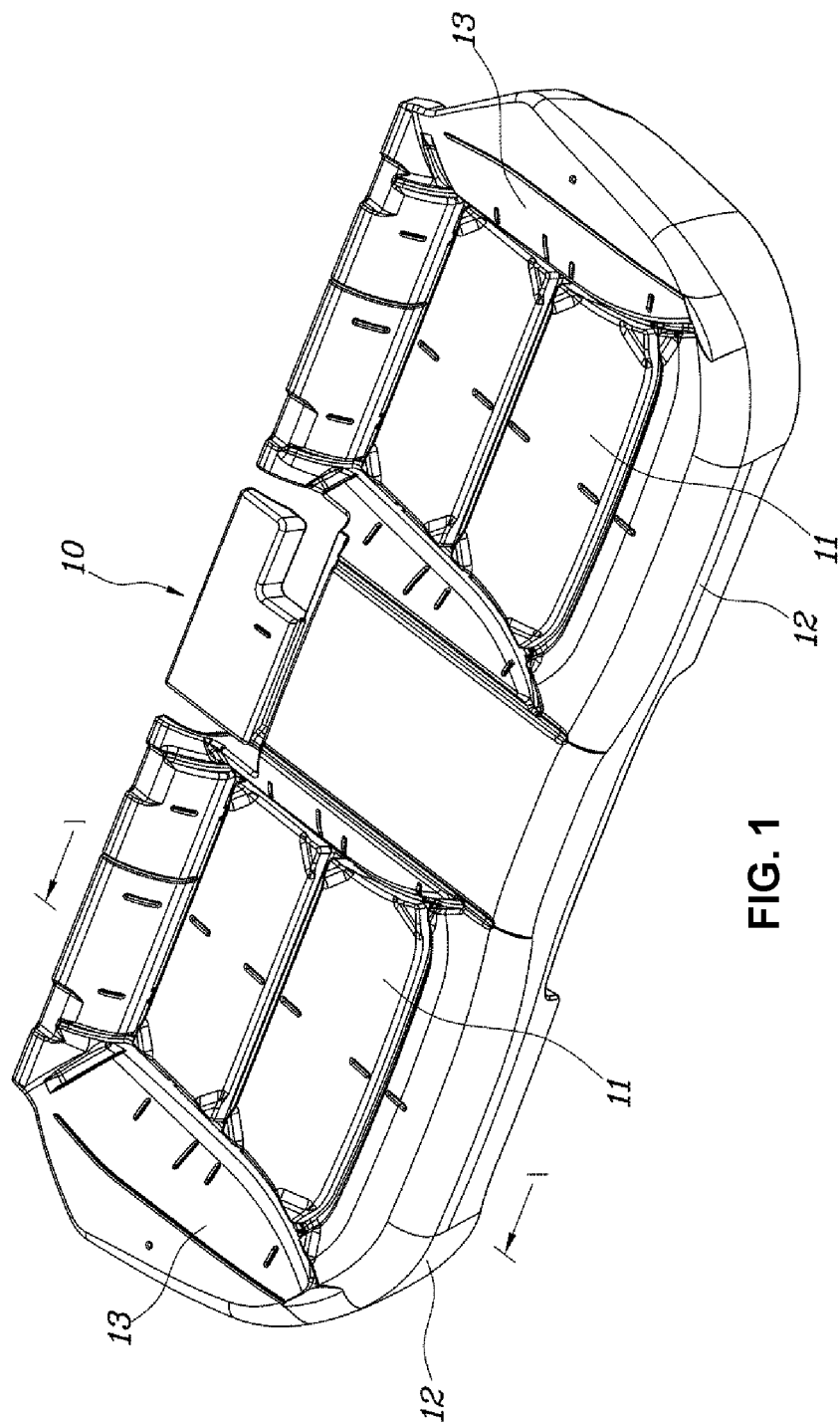
FIG. 1 is a perspective view of a slim foam pad for vehicle seats manufactured using a manufacturing method according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
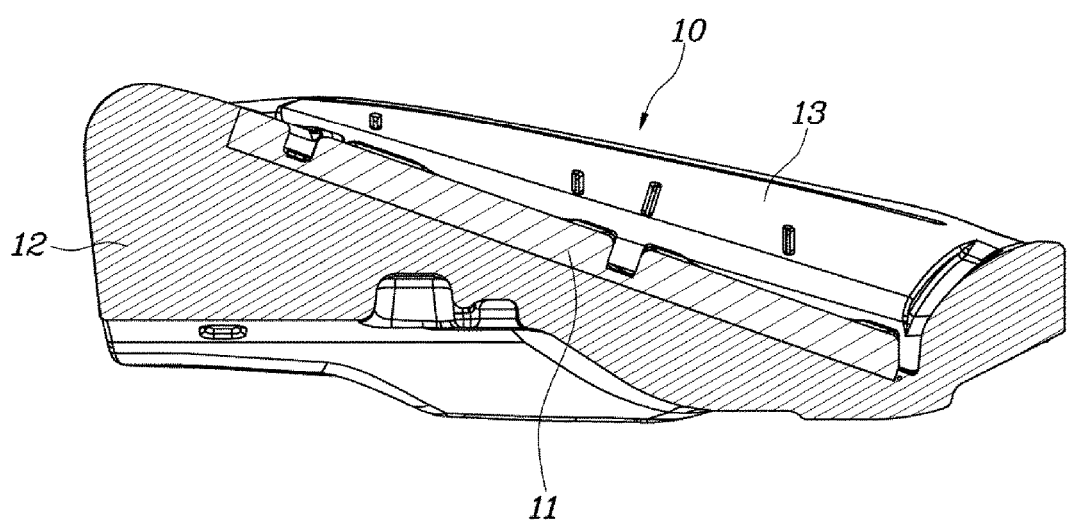
FIG. 2 is a sectional view taken along line I-I of FIG. 1.

FIG. 1 and FIG. 2 show a slim foam pad 10 for vehicle seats according to an exemplary embodiment of the present invention. The foam pad 10 includes an upper pad 11, on which an occupant is accommodated and on which the load of the occupant is thus concentrated, a lower pad 12 integrally coupled to the upper pad 11 configured to cover a bottom surface and a side surface of the upper pad 11, and a bolster 13 integrally coupled to a side of the lower pad 12.

The foam pad 10, which is configured to include the upper pad 11, the lower pad 12, and the bolster 13, is covered with a pad cover (e.g., a seat cover or a cover) to form a vehicle seat.

The foam pad 10 according to an exemplary embodiment of the present invention is characterized in that the foam pad 10 is a slim foam pad having a small thickness. To the present end, the foam pad 10 according to an exemplary embodiment of the present invention is characterized that any additional border separation members (e.g., hardness separation members or pieces of non-woven fabric) are not provided at the border between the upper pad 11 and the lower pad 12 or at the border between the lower pad 12 and the bolster 13.

In addition, the foam pad 10 according to an exemplary embodiment of the present invention is characterized in that the components of the foam pad 10 have different magnitudes of hardness. That is, the upper pad 11 may be a foam pad which is soft to improve riding comfort, the lower pad 12 may be a foam pad which is hard to securely support the upper pad 11, and the bolster 13 may be a foam pad which is hard to maintain the posture of the occupant.

That is, the upper pad 11 may be manufactured to be softer than the lower pad 12 and the bolster 13, the lower pad 12 and the bolster 13 may be manufactured to be harder than the upper pad 11, and the lower pad 12 and the bolster 13 may be manufactured to have different magnitudes of hardness or the same magnitude of hardness.

In the case in which the lower pad 12 and the bolster 13 are manufactured to have different magnitudes of hardness, the bolster 13 may be manufactured to be harder than lower pad 12. However, the present invention is not limited thereto.

Figure 3:
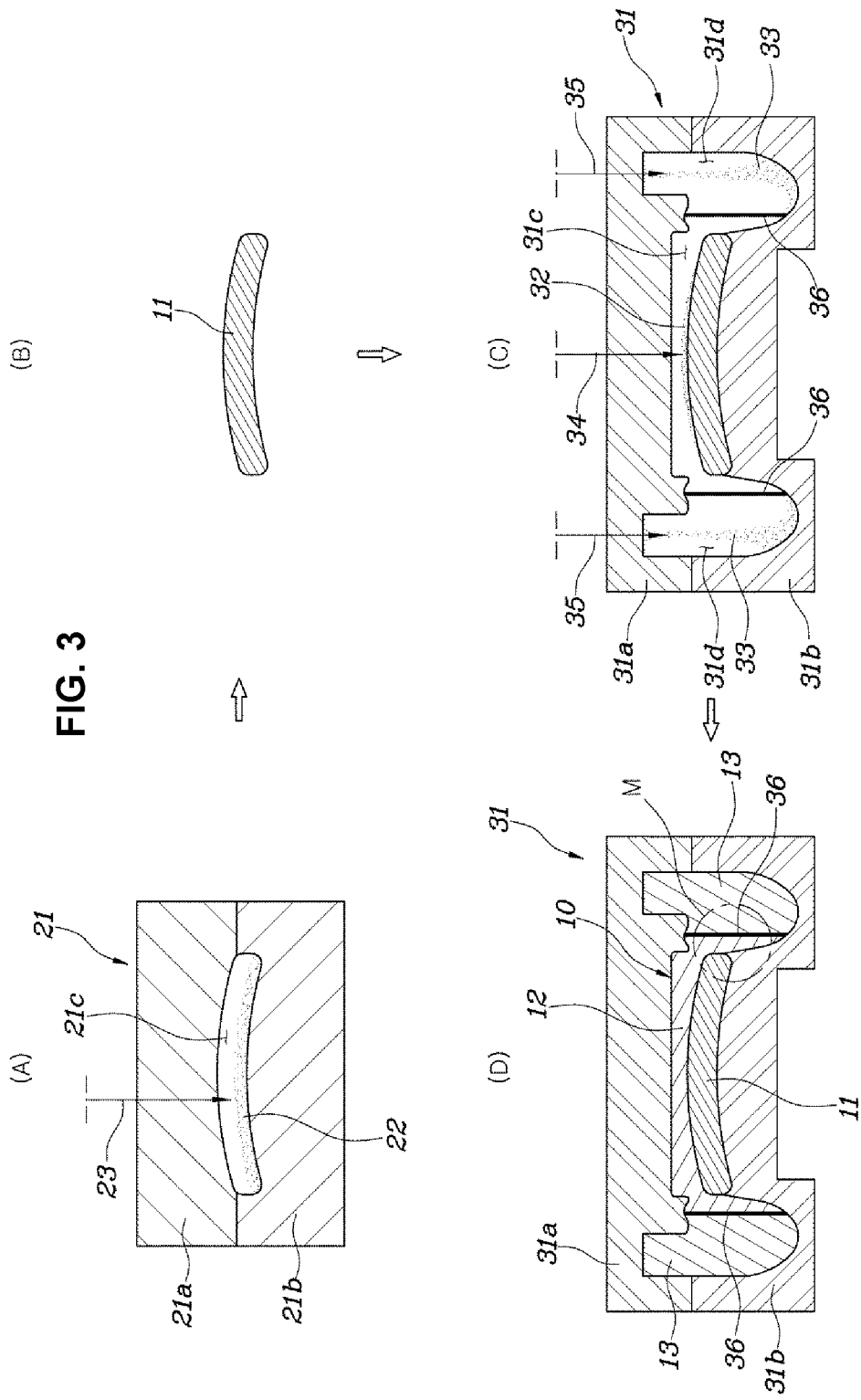
FIG. 3 is views illustrating a method of manufacturing a slim foam pad for vehicle seats according to an exemplary embodiment of the present invention.

A method of manufacturing the slim foam pad according to an exemplary embodiment of the present invention will be described with reference to FIG. 3.

First, as shown in FIG. 3(A), a first foam solution 22 is injected into a cavity 21c in a first mold 21, and foaming is performed in the state in which an upper mold 21a and a lower mold 21b are coupled to each other, wherein an upper pad 11 is separately manufactured.

The first foam solution 22 is injected through a first nozzle 23.

The manufactured upper pad 11 is removed from the first mold 21, as shown in FIG. 3(B).

Subsequently, the upper pad 11 is inserted into a second mold 31, as shown in FIG. 3(C).

The second mold 31 includes an upper mold 31a and a lower mold 31b. The separately manufactured upper pad 11 is placed on the lower mold 31b, a second foam solution 32 is injected into a lower pad cavity 31c, a third foam solution 33 is injected into a bolster cavity 31d, and foaming is performed in the state in which the upper mold 31a and the lower mold 31b are coupled to each other.

As a result, the second foam solution 32 injected into the lower pad cavity 31c is foamed in the state of being in contact with one surface of the upper pad 11, wherein a lower pad 12 integrally coupled to the upper pad 11 is manufactured, as shown in FIG. 3(D).

In addition, the third foam solution 33 injected into the bolster cavity 31d is also foamed, wherein a bolster 13 integrally coupled to the lower pad 12 is manufactured, as shown in FIG. 3(D).

The second foam solution 32 is injected through a second nozzle 34, and the third foam solution 33 is injected through a third nozzle 35.

Since the second foam solution 32 is foamed in the state of being in direct contact with one surface of the upper pad 11 inserted into the second mold 31, as described above, any additional border separation member (e.g., a hardness separation member or a portion of non-woven fabric) is not provided at the border between the upper pad 11 and the lower pad 12. In addition, any additional border separation member (e.g., a hardness separation member or a portion of non-woven fabric) is not provided at the border between the lower pad 12 and the bolster 13. According to an exemplary embodiment of the present invention, therefore, it is possible to manufacture the slim foam pad having a small thickness. Furthermore, it is possible to reduce manufacturing costs and to improve productivity utilizing the present invention.

In addition, when the second foam solution 32 is injected into the second mold 31, as described above, the third foam solution 33 is also injected into the bolster cavity 31d in the second mold 31 to simultaneously manufacture the lower pad 12 integrally coupled to the upper pad 11 and the bolster 13 integrally coupled to the lower pad 12 by foaming. Consequently, it is possible to greatly reduce a time necessary to manufacture the foam pad, improving productivity.

When the foam pad 10 manufactured in the second mold 31 is removed from the second mold 31, the manufacturing of a slim foam pad 10 as shown in FIG. 1 and FIG. 2 is completed.

FIG. 1 shows a slim foam pad for rear seats by way of example. A slim foam pad for front seats is manufactured using the same method.

Meanwhile, the upper pad 11, the lower pad 12, and the bolster 13 may be manufactured to have different magnitudes of hardness. To the present end, the first foam solution 22 may be softer than the second foam solution 32 and the third foam solution 33, the second foam solution 32 may be harder than the first foam solution 22, and the third foam solution 33 may be harder than the second foam solution 32.

At least one material selected from the group including polyurethane, polyethylene, polypropylene, and polyvinyl chloride may be used as an exemplary soft first foam solution 22. For example, a soft pad may include urethane foam. The urethane foam may be created through polymerization of a hydroxyl compound and isocyanate, and may be obtained through urethane coupling based on an additional reaction between polyisocyanate and polyol.

Any known material may be used as an exemplary embodiment of the hard second foam solution 32 and third foam solution 33, as long as the material is harder than the polyurethane, polyethylene, polypropylene, or polyvinyl chloride of the first foam solution 22.

In another example, the upper pad 11 may be manufactured to have a magnitude of hardness different from the magnitude of hardness of the lower pad 12 or the bolster 13, and the lower pad 12 may be manufactured to have same magnitude of hardness as the bolster 13. To the present end, the first foam solution 22 may be softer than the second foam solution 32, the second foam solution 32 may be harder than the first foam solution 22, and the second foam solution 32 and the third foam solution 33 may be solutions having the same ingredients.

In addition, the upper pad 11 inserted into the second mold 31 may be fixed by vacuum suction to prevent movement. After the upper pad 11 is fixed by vacuum suction, the second foam solution 32 and the third foam solution 33 may be injected into the second mold 31.

That is, when the upper pad 11 inserted into the second mold 31 moves when the second foam solution 32 and the third foam solution 33 are injected into the second mold 31, the quality of the finished foam pad 10 may be deteriorated. To solve the above problem, the second foam solution 32 and the third foam solution 33 are injected into the second mold 31 after the upper pad 11 inserted into the second mold 31 is fixed to prevent movement.

Vacuum suction is advantageous in fixing the upper pad 11, since no additional fixing member is needed. To the present end, as shown in FIG. 4, an air channel 31e may be formed in the lower mold 31b of the second mold 31, and an external air compressor may be connected to the air channel 31e.

A partition 36 is disposed in the bolster cavity 31d in the second mold 31 to prevent the second foam solution 32 and the third foam solution 33 injected into the second mold 31 from being mixed with each other. In the finished slim foam pad 10, the lower pad 12 and the bolster 13 are prevented from being mixed with each other, wherein the quality of the slim foam pad is improved.

Figure 4:
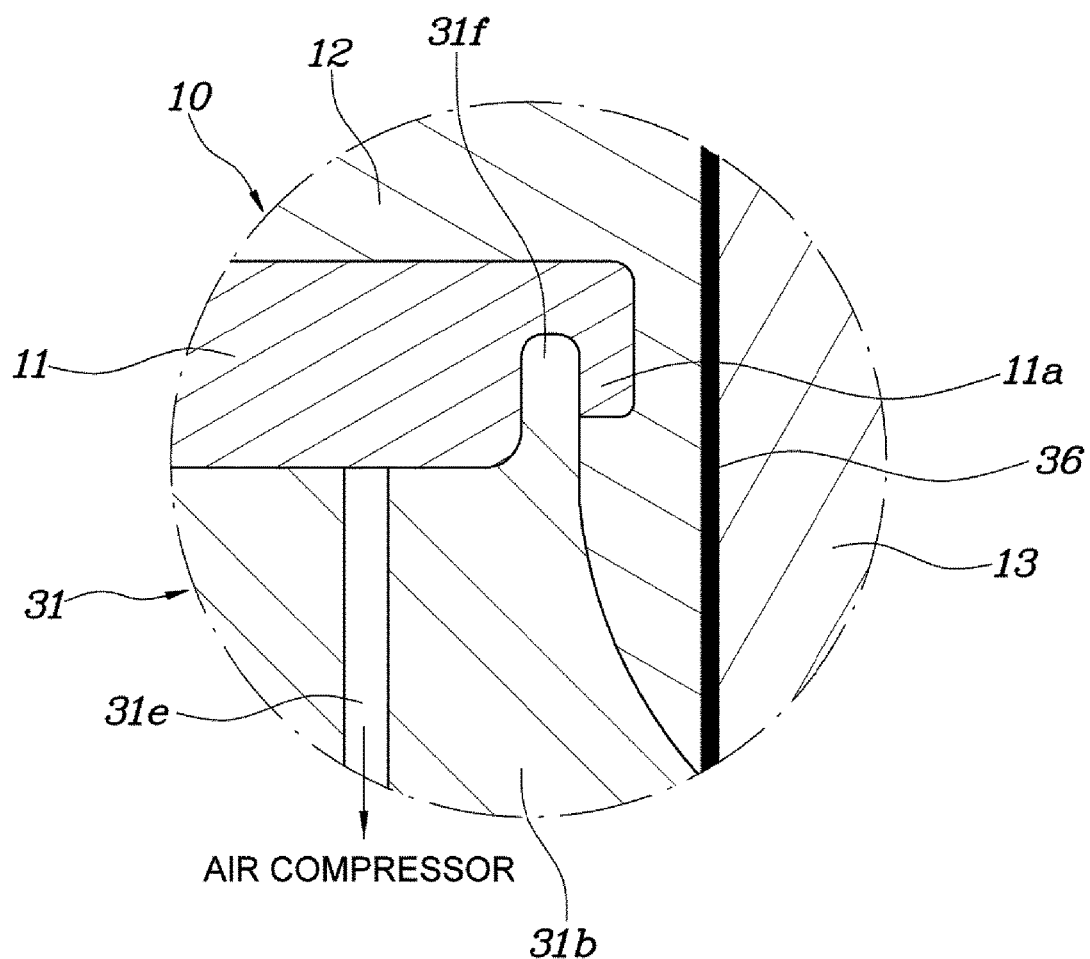
FIG. 4 is an enlarged view of region M in FIG. 3.

When the upper pad 11 is inserted into the second mold 31, as shown in FIG. 4, a flange 11a defining the external edge portion of the upper pad 11 covers a protrusion 31f formed in the second mold 31 in a surrounding fashion to prevent the second foam solution 32 from being introduced into the gap between the upper pad 12 and the second mold 31. In the finished slim foam pad 10, the hard lower pad 12 is prevented from covering the upper surface of the soft upper pad 11, wherein the riding comfort of the occupant is improved through the soft upper pad 11.

In the exemplary embodiment of the present invention, as described above, any additional border separation member (e.g., a hardness separation member or a portion of non-woven fabric) is not provided at the border between the soft upper pad 11 and the hard lower pad 12. In addition, any additional border separation member (e.g., a hardness separation member or a portion of non-woven fabric) is not provided at the border between the lower pad 12 and the bolster 13. Consequently, it is possible to manufacture the slim foam pad 10 having a small thickness. Furthermore, it is possible to reduce manufacturing costs and to improve productivity according to an exemplary embodiment of the present invention.

In addition, when the lower pad 12 integrally coupled to the upper pad 11 is manufactured, the bolster 13 integrally coupled to the lower pad 12 is simultaneously manufactured by foaming. Consequently, it is possible to greatly reduce the time necessary to manufacture the foam pad of the present invention, improving productivity.

As is apparent from the above description, any additional border separation member (e.g., a hardness separation member or a portion of non-woven fabric) is not provided at the border between the soft upper pad and the hard lower pad. In addition, any additional border separation member (e.g., a hardness separation member or a portion of non-woven fabric) is not provided at the border between the lower pad and the bolster. Consequently, it is possible to manufacture a slim foam pad having a small thickness. Furthermore, it is possible to reduce manufacturing costs and to improve productivity according to an exemplary embodiment of the present invention.

In addition, when the lower pad integrally coupled to the upper pad is manufactured, the bolster integrally coupled to the lower pad is simultaneously manufactured by foaming. Consequently, it is possible to greatly reduce the time necessary to manufacture the foam pad of the present invention, improving productivity.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustrative and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defend by the Claims appended hereto and their equivalents.

What is claimed is:

1. A method of manufacturing a foam pad for vehicle seats, the method comprising:
   injecting a first foam solution into a first mold to manufacture an upper pad;
   inserting the manufactured upper pad into a second mold; and
   injecting a second foam solution to a surface of the upper pad inserted into the second mold to manufacture a lower pad integrally coupled to the upper pad,
   wherein the second foam solution is foamed in a state of being in direct contact with the surface of the upper pad, whereby no additional border separation member is provided at a border between the upper pad and the lower pad, and
   wherein, when the second foam solution is injected into the second mold, a third foam solution is injected into a bolster cavity defined in the second mold to simultaneously manufacture the lower pad integrally coupled to the upper pad and a bolster integrally coupled to the lower pad by foaming.

2. The method according to claim 1,
   wherein the first foam solution is softer than the second foam solution and the third foam solution,
   wherein the second foam solution is harder than the first foam solution,
   wherein the third foam solution is harder than the second foam solution, and
   wherein the upper pad, the lower pad, and the bolster have different magnitudes of hardness.

3. The method according to claim 1,
   wherein the first foam solution is softer than the second foam solution,
   wherein the second foam solution is harder than the first foam solution,
   wherein the second foam solution and the third foam solution are solutions having same ingredients, and
   wherein the upper pad has a magnitude of hardness different from a magnitude of hardness of the lower pad or the bolster while the lower pad has same magnitude of hardness as the bolster.

4. The method according to claim 1,
   wherein the upper pad inserted into the second mold is fixed by vacuum suction to prevent movement of the upper pad, and
   wherein the second foam solution and the third foam solution are injected into the second mold after the upper pad is fixed by vacuum suction.

5. The method according to claim 1,
   wherein a partition is provided in the bolster cavity, and
   wherein the second foam solution and the third foam solution injected into the second mold are prevented from being mixed with each other by the partition.

6. The method according to claim 1,
   wherein a flange defining an external edge portion of the upper pad surrounds a protrusion formed in the second mold when the upper pad is inserted into the second mold, and
   wherein the second foam solution is prevented from being introduced into a gap between the upper pad and the second mold by the flange, which surrounds the protrusion.

7. A foam pad for vehicle seats manufactured using the method according to claim 1, the foam pad including:
   the upper pad, on which an occupant is accommodated;
   the lower pad integrally coupled to the upper pad to cover a bottom surface and a side surface of the upper pad, the lower pad being harder than the upper pad; and
   the bolster integrally coupled to a side of the lower pad, the bolster being harder than the upper pad, wherein no additional border separation members are provided at a border between the upper pad and the lower pad or at a border between the lower pad and the bolster.

8. The foam pad according to claim 7, wherein
   the bolster is harder than the lower pad, wherein the lower pad and the bolster have different magnitudes of hardness, or
   the lower pad and the bolster have same magnitude of hardness.

* * * * *